United States Patent [19]

Arimatsu

[11] 4,456,806
[45] Jun. 26, 1984

[54] METHOD AND APPARATUS FOR THE HIGH FREQUENCY PREHEATING OF ELASTOMERIC PRODUCTS

[75] Inventor: Toshio Arimatsu, Akashi, Japan

[73] Assignee: Sumitomo Rubber Industries, Ltd., Hyogo, Japan

[21] Appl. No.: 402,424

[22] Filed: Jul. 28, 1982

[30] Foreign Application Priority Data

Aug. 6, 1981 [JP] Japan .................................. 56-123726

[51] Int. Cl.³ ............................................. H05B 6/68
[52] U.S. Cl. ..................... 219/10.55 M; 219/10.55 B; 219/10.55 F; 219/10.55 R; 264/26; 425/174.8 E
[58] Field of Search ................. 219/10.55 B, 10.55 F, 219/10.55 R, 10.55 E, 10.55 A, 10.55 M, 494; 264/25, 26, 27, 236, DIG. 46; 425/174.8 R, 174.8 E, 174.4, 174; 374/110, 115, 120

[56] References Cited

U.S. PATENT DOCUMENTS

| | | | |
|---|---|---|---|
| 3,474,211 | 10/1969 | Soulier | 219/10.55 F |
| 3,745,291 | 7/1973 | Peterson et al. | 219/10.55 R |
| 3,806,689 | 4/1974 | Kegeresis et al. | 219/10.55 F |
| 3,867,606 | 2/1975 | Peterson | 219/10.55 R |
| 4,157,464 | 6/1979 | Smith et al. | 219/10.55 F X |
| 4,163,140 | 7/1979 | Bardet | 219/10.55 B |
| 4,198,554 | 4/1980 | Wayne | 219/10.55 A |

FOREIGN PATENT DOCUMENTS 56-150531  11/1981  Japan .................... 219/10.55 M

*Primary Examiner*—B. A. Reynolds
*Assistant Examiner*—Philip H. Leung
*Attorney, Agent, or Firm*—Birch, Stewart, Kolasch and Birch

[57] ABSTRACT

The disclosure relates to a method and apparatus for preheating to a predetermined temperature an elastomer product, such as a green tire, in preparation for vulcanization. The elastomer product is placed in a lateral posture on a rotatable table within a preheating chamber. While rotating the elastomer product, a high frequency wave irradiation is intermittently applied toward the upper surface of the elastomer product through a first waveguide. Simultaneously, additional high frequency wave irradiation is intermittently applied onto side portions of the elastomer product through at least one horn member coupled through a corresponding waveguide. The horn member is positioned such that it can be moved vertically or pivoted angularly. The temperature is measured in both a radial and circumferential direction of the elastomer product and maintained uniform during heating by varying the irradiation accordingly.

9 Claims, 5 Drawing Figures

| 2 MIN. ON | 1 MIN. OFF | 2 MIN. ON | 1 MIN. OFF | 2 MIN. ON | 1 MIN. OFF | 2 MIN. ON |
|---|---|---|---|---|---|---|

METHOD AND APPARATUS FOR THE HIGH FREQUENCY PREHEATING OF ELASTOMERIC PRODUCTS

BACKGROUND OF THE INVENTION

The present invention generally relates to a process for the vulcanization of elastomeric products for example, of synthetic rubber, elastomeric plastics, etc., and more particularly, to an improved method of preheating green tires for pneumatic tires, soild tires and the like up to a predetermined temperature prior to vulcanization thereof by a vulcanizing machine.

Conventionally, in the vulcanization of elastomeric products such as a green tire having a thick portion with a large heat capacity, there are such disadvantages that, if the green tire is heated at high temperatures to achieve the best state for vulcanization up to a central portion of its thick portion, the outer portion of the green tire is undesirably brought into a state of over-vulcanization when the central portion thereof has reached the optimum state for vulcanization, with an excessive waste of thermal energy involved. Therefore, it has been a general practice to effect a preheating operation by which the elastomer product is preheated up to a predetermined temperature prior to the vulcanization thereof.

For the preheating as described above, a preheating process through irradiation by microwaves (i.e. dielectric heating) has been mainly employed owing to such advantages that, first, by the dielectric heating, the temperature rise begins at the inner-portion of the elastomer product which is most difficult site for the temperature to be increased during conduction heating, i.e. at the central portion thereof where the vulcanization is generally delayed, for example, at the innermost portion of a tread of the green tire. This is very desirable from the viewpoint of proper vulcanization. Secondly, reduction of the total time required for the vulcanization becomes possible, since the predetermined preheating temperature may be reached in a comparatively short period of time.

However, in a conventional preheating method of an oven system in which the preheating is effected in a preheating chamber through application of microwaves directed at an elastomer product mounted on a turntable, from a waveguide provided thereover, when a green tire, which normally has different thicknesses and rubber components in a radial direction, is to be processed, deviation in the preheating temperatures inevitably takes place in the radial direction, the resulting in a non-uniformity of preheating temperatures in the green tire on the whole.

SUMMARY OF THE INVENTION

Accordingly, an essential object of the present invention is to provide a method of preheating elastomer products in a vulcanization process, which is capable of uniformly preheating the elastomer product up to a predetermined temperature in an efficient manner.

Another important object of the present invention is to provide a method of preheating elastomer products as described above which can be readily introduced into a vulcanizing process through a simple arrangement at low energy cost.

A further object of the present invention is to provide an improved preheating arrangement for effecting the preheating method of the present invention as described above in an efficient manner.

In accomplishing these and other objects according to one preferred embodiment of the present invention, there is provided a method of preheating an elastomer product which includes the steps of laterally placing an elastomer product, for example, a green tire, on a turntable rotatably provided within a preheating chamber for rotation by a drive means, and intermittently applying high frequency waves onto an upper surface of the elastomer product which is being rotated on the turntable, through a first wave guide means provided above the turntable and coupled to a first high frequency oscillating means. Simultaneously therewith, high frequency waves are intermittently applied onto a side portion of the rotating elastomer product, through a horn means arranged selectively to be vertically movable or capable of being varied in its angular positions and coupled, through a second waveguide means, to a second high frequency oscillating means for heat diffusion within the elastomer product. Temperatures are measured in both the radial direction and circumferential direction of the elastomer product, during interruption of irradiation by the high frequency waves, by a noncontact thermometer so as to render preheating temperature within the elastomer product uniform until the predetermined temperature is rendered, through the increase and decrease of the high frequency wave output according to the measured temperatures.

By the improved preheating method according to the present invention, as described above, it is now possible to preheat elastomer products up to a required temperature in an efficient manner through simple procedures.

BRIEF DESCRIPTION OF THE DRAWINGS

These and other objects and features of the present invention will become apparent from the following description taken in conjunction with the preferred embodiment thereof and with reference to the accompanying drawings, in which.

DETAILED DESCRIPTION OF THE INVENTION

Figure 1:
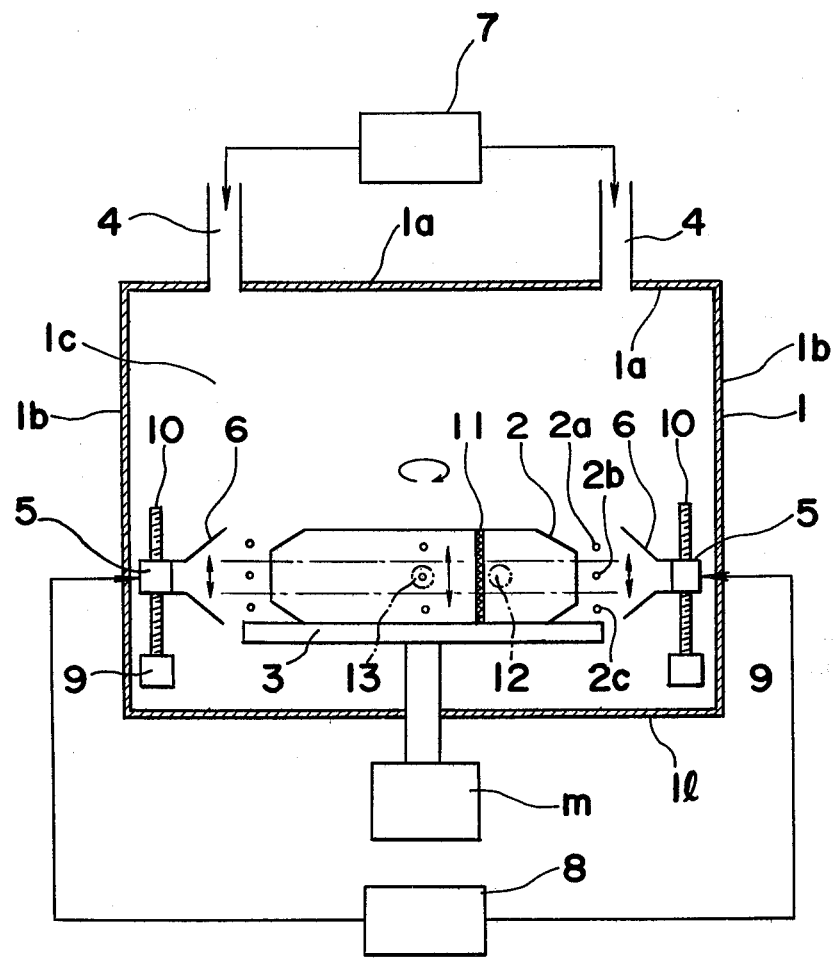
FIG. 1 is a schematic side sectional view of a microwave preheating arrangement by which the method of preheating elastomer products according to the present invention may be applied.

Before the description of the present invention proceeds, it is to be noted that like parts are designated by like reference numerals throughout the accompanying drawings.

Referring now the the drawings, there is seen in FIG. 1 a microwave preheating arrangement to which a method of preheating elastomer products according to one preferred embodiment of the present invention may be applied.

The microwave preheating arrangement as illustrated in FIG. 1 includes a preheating chamber 1 defined by a top wall 1a, side walls 1b and 1c and a bottom wall 1l, a turn table 3 rotatably provided at the central portion above and adjacent to the bottom wall 1*l* of the preheating chamber 1 for rotation by a driving means such, as a motor m, with an elastomer product, for example, a green tire 2 being laterally mounted thereon, a set of waveguides 4 provided in the top wall 1*a* in positions corresponding to the peripheral surface of the green tire 2 and coupled to a magnetron 7 provided outside the preheating chamber 1, and a set of horns 6 connected to another set of waveguides 5 which are respectively provided adjacent to the side walls 1*b* so as to be coupled to a magnetron 8 also provided outside the preheating chamber 1.

Figure 2:
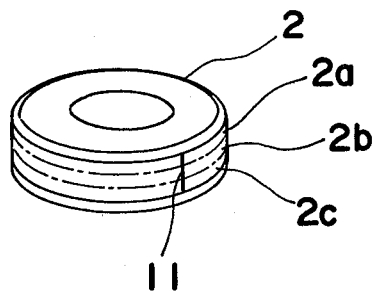
FIG. 2 is a perspective view of a green tire to be processed by the preheating arrangement of FIG. 1.

The horns 6 are respectively supported by corresponding threaded shafts 10 each associated with motors 8 for rotation, and arranged to be vertically moved so as to be positioned, in a central portion thereof at three points including an upper stage 2*a*, a middle stage 2*b*, and a lower stage 2*c*, predetermined by dividing the peripheral side face of the green tire 2 into three portions (FIG. 2).

It should be noted here that the above arrangement may be modified in such a manner that each of the horns 6 is supported by a pivotal mechanism (not shown) for upward and downward movement so as to be stopped, in its central portion, at the three predetermined positions for the upper, middle and lower stages 2*a*, 2*b* and 2*c* of the green tire 2.

On one of the side walls 1*c* of the preheating chamber 1, there are provided a reflecting type phototube 12 for detecting a mark 11 painted at a predetermined position on a peripheral side face of the green tire 2 as shown in FIG. 2, and an infrared thermometer 13 for measuring temperatures in each stage by stopping at the predetermined three points for the upper, middle and lower stages 2*a*, 2*b*, 2*c* of the green tire 2 during interruption of the microwave irradiation.

Figure 3:
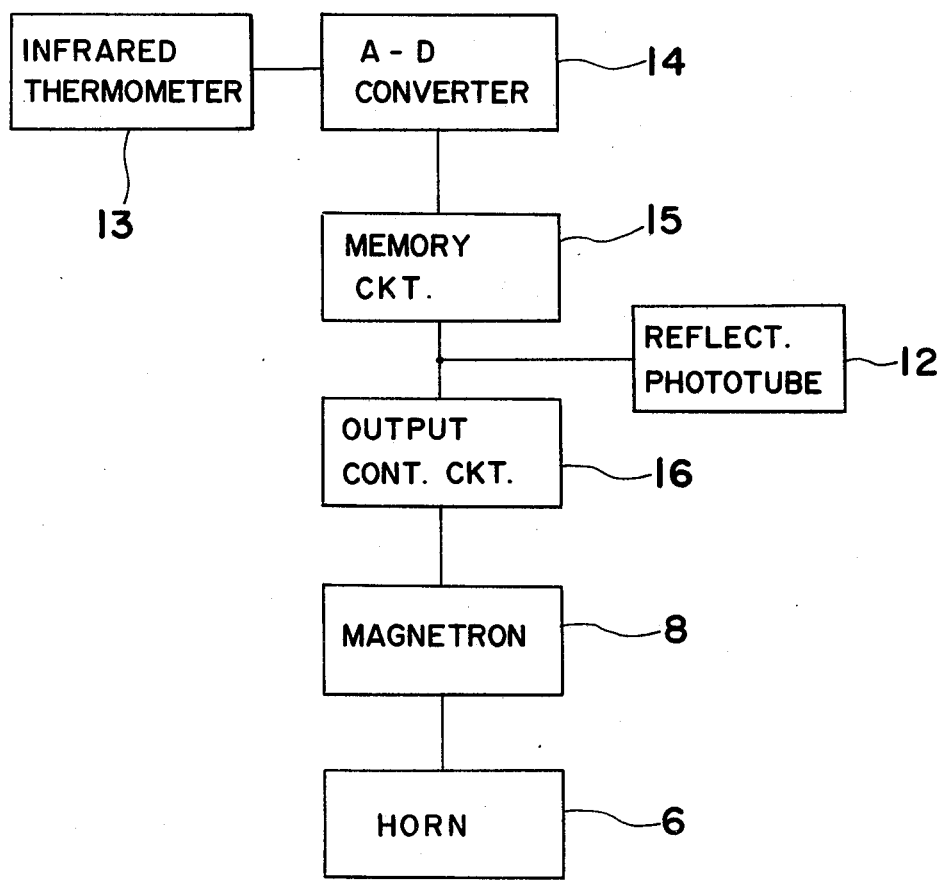
FIG. 3 is a block diagram of a control circuitry for the arrangement of FIG. 1.

Referring now to FIG. 3, there is seen a control circuit for controlling the function of the magnetron 8. In the control circuit of FIG. 3, the infrared thermometer 13 is coupled, through an A-D converter 14, to a memory circuit 15 which is further coupled, through an output control circuit 16 and the magnetron 8, to the horns 6, with the reflecting type phototube 12 being connected to a junction between the memory circuit 15 and the output control circuit 16, as shown.

Figures 4, 5:
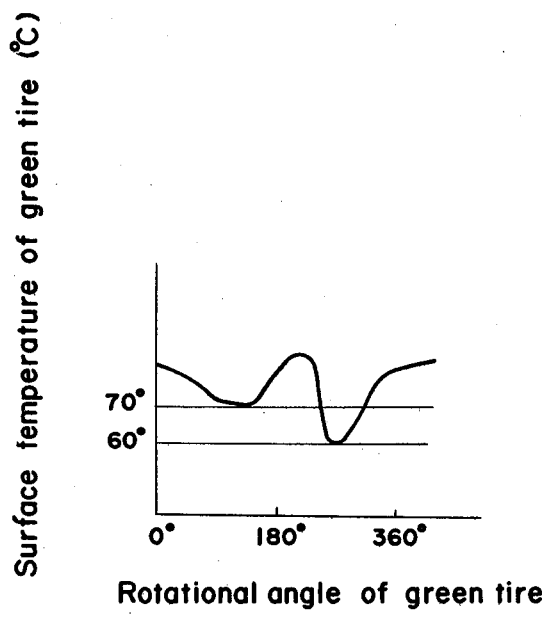
FIG. 4 is a graph showing one example of the relationship between surface temperatures and rotational angles of a green tire during one rotation thereof.
FIG. 5 is a time chart illustrating one cycle for intermittent irradiation of microwaves.

In the above circuit construction, the temperature signal from the infrared thermometer 13 is memorized in the memory circuit 15 through the A-D converter 14, and through the output control circuit 16, the magnetron 8 is so controlled as to generate microwaves intermittently by repeating, approximately four times, a cycle including generation for two minutes and interruption for one minute of the microwaves as shown in FIG. 5, with the microwave output being properly increased or decreased to suit the purpose.

By the foregoing arrangement, microwave output, for example, of 3 KW, is intermittently applied in a radial direction through the waveguides 4 from above the green tire 2 (e.g. with size of 10.00-20) which is being rotated by the turntable 3 at a speed of about 20 r.p.m., while microwave output, for example, of 5 KW is intermittently applied laterally through the horns 6 in a circumferential direction of the tire 2.

After irradiation by the microwave energy for two minutes, at the interruption for one minute, the mark 11 of the green tire 2 is detected by the reflecting type phototube 12, and during one rotation of the green tire 2, temperature at the upper stage 2*a* of the green tire 2 is measured by the infrared thermometer 13, for example, as shown by the graph in FIG. 4. The temperature thus measured is memorized in the memory circuit 15, and the microwave output from the horns 6 is controlled by the control circuit 16 based on a program preliminarily determined, in the range between 5 and 2 KW in such a manner that, for example, if the temperature is at 60° C., the voltage is set at 7000 V (output 4 KW), and, if the temperature is at 70° C., the voltage is rendered to be 3000 V (output 3 KW).

When the output from the horns 6 is less than 2 KW, there is a possibility that the output may undesirably fluctuate, while to the contrary, if the output exceeds 5 KW, the temperature is excessively raised beyond an upper limit of the preheating temperature.

After the one cycle, as shown in FIG. 5, the horns 6 and the infrared thermometer 13 are shifted down to the middle stage 2*b* of the tire 2 for repetition of the same cycle, and then, further shifted down to the lower stage 2*c* for similar repetition of the same cycle.

By the repetition of the intermittent irradiation of microwaves as described above, uniform preheating of the green tire 2 on the whole is expedited through heat diffusion by heat conduction, and the temperature in the radial direction is adjusted through adjustments in the height of the horns 6, while the temperature in the circumferential direction is adjusted through increase or decrease of the microwave output, and thus, the preheating temperature of the entire green tire 2 is rendered to be still further uniform.

As is clear from the foregoing description, according to the present invention, high frequency waves are intermittently applied onto the eleastomer product mounted on the turntable, from the upper and side portions thereof, while the temperatures of the elastomer product in the radial and circumferential directions are measured for adjustments of output and direction of irradiation of the high frequency waves, and therefore, the preheating temperature in the elastomeric products per each piece and per each lot may be made uniform quickly and positively for efficient preheating.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. A method of preheating an elastomer product to a predetermined temperature which comprises the steps of:

placing in a lateral posture said elastomer product on a turntable rotatably provided within a preheating chamber for rotation by a drive means, rotating said elastomer product, intermittently applying high frequency irradiation toward an upper surface of said elastomer product, while said elastomer product is being rotated on said turntable, through a first waveguide means provided above said turntable and said elastomer product, coupled to a first high frequency oscillating means, simultaneously, intermittently applying high freqeuncy irradiation onto a side portion of said elastomer product during said rotation thereof through a horn means positioned so as to be capable of being moved vertically or capable of being pivoted angularly in an upward and downward manner, said horn means being coupled through a second waveguide means to a second high frequency oscillating means for heat diffusion within said elastomer product, and measuring the temperature in a radial direction and circumferential direction of said elastomer product during the interrupted periods of said intermittment high frequency irradiation irradiated from said waveguide means by a non-contact thermometer so as to monitor the temperature within said elastomer product such that said temperature is maintained uniform during said preheating, by varying said high frequency wave irradiation from either or both of said first and second waveguide means.

2. The method of claim 1, wherein said first waveguide means comprises a pair of waveguides provided on a top wall of said preheating chamber coupled to a first magnetron which serves as said first high frequency means.

3. The method of claim 1, wherein said horn means comprises a pair of horns coupled, through corresponding waveguide means, to a second magnetron which serves as said second high frequency oscillating means, said horns being arranged to be vertically movable through screw thread mechanisms or capable of being pivoted angularly through pivotal mechanisms.

4. The method of claim 1, wherein said non-contact thermometer comprises an infrared thermometer.

5. The method of claim 1, wherein said elastomer product comprises a green tire.

6. A preheating apparatus for preheating elastomer product to a predetermined temperature which comprises:

a preheating chamber, a turntable rotatably provided in said preheating chamber for positioning thereon said elastomer product to be processed, a first waveguide means provided above said turntable and said elastomer product, coupled to a first high frequency oscillating means, for intermittently applying high frequency irradiation toward an upper surface of said elastomer product during rotation of said turntable, horn means coupled through a second waveguide means provided at side portions of said turntable and said elastomer product to a second high frequency oscillating means, positioned so as to be capable of being moved vertically or capable of being pivoted angularly for intermittently applying high frequency irradiation onto side portions of said elastomer product so as to diffusion heat within said elastomer product, and a non-contact thermometer arranged to measure temperature in a radial and circumferential direction of said elastomer product during the interrupted periods of said intermittent irradiation by said high frequency irradiating means thereby controlling the temperature within said elastomer product such that it is maintained uniform during said preheating, by varying said high frequency irradiation from either or both of said first and second waveguide means according to said meausred temperature.

7. The preheating apparatus of claim 6, wherein said first waveguide means comprises a pair of waveguides provided on a top wall of said preheating chamber coupled to a first magnetron and said horn means comprises a pair of horns coupled, through corresponding waveguide means, to a second magnetron.

8. The preheating apparatus of claim 7, wherein said horns are arranged to be movable vertically or pivoted angularly so as to selectively irradiate side portions of said elastomer product.

9. The preheating apparatus of claim 6, wherein said non-contact thermometer comprises an infrared thermometer.

* * * * *